(12) United States Patent
Sawada et al.

(10) Patent No.: US 10,807,636 B2
(45) Date of Patent: Oct. 20, 2020

(54) ELECTRIC POWER STEERING APPARATUS

(71) Applicant: NSK LTD., Tokyo (JP)

(72) Inventors: Hideki Sawada, Tokyo (JP); Yukie Fujiwara, Tokyo (JP); Ryo Minaki, Tokyo (JP); Takayoshi Sugawara, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/479,269

(22) PCT Filed: Feb. 19, 2018

(86) PCT No.: PCT/JP2018/005705
§ 371 (c)(1),
(2) Date: Jul. 19, 2019

(87) PCT Pub. No.: WO2018/151291
PCT Pub. Date: Aug. 23, 2018

(65) Prior Publication Data
US 2019/0382048 A1 Dec. 19, 2019

(30) Foreign Application Priority Data

Feb. 20, 2017 (JP) .................................. 2017-029394

(51) Int. Cl.
*B62D 5/04* (2006.01)
*B62D 6/00* (2006.01)
*B62D 15/02* (2006.01)

(52) U.S. Cl.
CPC ............. *B62D 5/0463* (2013.01); *B62D 6/00* (2013.01); *B62D 15/0215* (2013.01)

(58) Field of Classification Search
None
See application file for complete search history.

(56) References Cited

U.S. PATENT DOCUMENTS

| 10,065,679 | B2* | 9/2018 | Kinugasa | ................. B60Q 9/00 |
| 10,160,484 | B2* | 12/2018 | Lee | ....................... B62D 5/0457 |
| 2013/0304327 | A1* | 11/2013 | Morishita | ............ B62D 5/0463 701/43 |

FOREIGN PATENT DOCUMENTS

| JP | 08-337181 A | 12/1996 |
| JP | 11-078953 A | 3/1999 |

(Continued)

OTHER PUBLICATIONS

International Search Report for PCT/JP2018/005705 dated May 15, 2018 [PCT/ISA/210].

(Continued)

*Primary Examiner* — Thomas G Black
*Assistant Examiner* — Ana D Thomas
(74) *Attorney, Agent, or Firm* — Sughrue Mion, PLLC

(57) ABSTRACT

An electric power steering apparatus that drives and controls a motor which applies an assist torque to a steering system of a vehicle and has a function switching between an assist mode and an automatic mode, including a torsion bar torsional angle calculating section to calculate a torsion bar torsional angle based on a torque information, an output-side column shaft relative angle generating section to output an output-side relative angle from an electrical angle signal of the motor, an actual handle angle calculating section to calculate an actual handle angle based on the torsion bar torsional angle and the output-side relative angle, a resonance filter to obtain an estimated handle angle in a hands-off state from the output-side relative angle, and a hands-on/off judging section to judge a hands-on state when a time that a deviation angle between the actual handle angle and the estimated handle angle is equal to or more than a predetermined angle is continued for the predetermined time or more.

9 Claims, 8 Drawing Sheets

(56) References Cited

FOREIGN PATENT DOCUMENTS

| JP | 11-208498 A | 8/1999 |
| JP | 2016-074356 A | 5/2016 |
| JP | 2016-088383 A | 5/2016 |

OTHER PUBLICATIONS

Written Opinion for PCT/JP2018/005705 dated May 15, 2018 [PCT/ISA/237].

* cited by examiner

PRIOR ART

PRIOR ART

PRIOR ART

ELECTRIC POWER STEERING APPARATUS

CROSS REFERENCE TO RELATED APPLICATIONS

This application is a National Stage of International Application No. PCT/JP2018/005705 filed Feb. 19, 2018, claiming priority based on Japanese Patent Application No. 2017-029394 filed Feb. 20, 2017.

TECHNICAL FIELD

The present invention relates to an electric power steering apparatus that has an assist mode to control a motor which applies an assist torque to a steering system of a vehicle when a driver steers the steering system, and an automatic mode to control the motor in response to a target steering angle which is continuously instructed by the vehicle when the vehicle autonomously runs, and inparticular to the electric power steering apparatus that performs a hands-on or hands-off judgment (judging one-hand-on a steering or hands-on the steering, or hands-off the steering) by utilizing angle information of the motor which is disposed at a downstream stage of a torque sensor, estimating a handle angle using a second order or higher resonance filter in harmony with a frequency response in hands-off, and comparing an estimated handle angle in the hands-off state with an actual handle angle, and performs an accurate manual input judgment without being affected by a noise relate to a free vibration system including a handle resonance.

BACKGROUND ART

A general configuration of a conventional electric power steering apparatus will be described with reference to FIG. 1. As shown in FIG. 1, a column shaft (a steering shaft or a handle shaft) 2 connected to a handle (a steering wheel) 1 is connected to steered wheels 8L and 8R through reduction gears 3, universal joints 4a and 4b, a pinion-and-rack mechanism 5, and tie rods 6a and 6b, further via hub units 7a and 7b. In addition, the steering shaft 2 is provided with a torque sensor 10 for detecting a steering torque Tr of the handle 1 and a steering angle sensor 14 for detecting a steering angle θh and, a motor 20 for assisting a steering force of the handle 1 is connected to the column shaft 2 through the reduction gears 3 whose reduction ratio is "1/N". The electric power is supplied to a control unit (ECU) 100 for controlling the electric power steering apparatus from a battery 13, and an ignition key signal is inputted into the control unit 100 through an ignition key 11. The control unit 100 calculates a current command value of an assist command (a steering assist command) based on the steering torque Tr detected by the torque sensor 10 and a vehicle speed Vs detected by a vehicle speed sensor 12, and controls a current supplied to the motor 20 by means of a voltage control command value Vref obtained by performing a compensation or the like to the calculated current command value. A steering angle sensor 14 for detecting the steering angle θh is not indispensable and may not be provided.

A controller area network (CAN) 40 to send/receive various information and signals on the vehicle is connected to the control unit 100, and it is also possible to receive the vehicle speed Vs from the CAN 40. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a central processing unit (CPU) (including a micro processor unit (MPU), a micro controller unit (MCU) and the like), and general functions performed by programs within the CPU are, for example, shown in FIG. 2.

Functions and operations of the control unit 100 will be described with reference to FIG. 2. The steering torque Tr from the torque sensor 10 and the vehicle speed Vs from the vehicle speed sensor 12 are inputted into a current command value calculating section 101. The current command value calculating section 101 calculates a steering assist command value Iref1 based on the steering torque Tr and the vehicle speed Vs using an assist map or the like. The calculated current command value Iref1 is added with a compensation signal CM for improving characteristics from a compensating section 110 at an adding section 102A. The steering assist command value Iref2 after addition is limited of the maximum value thereof at a current limiting section 103. The current command value Irefm limited of the maximum value is inputted into a subtracting section 102B, whereat a detected motor current value Im is subtracted from the current command value Irefm.

The subtracted result ΔI (=Irefm−Im) in the subtracting section 102B is current-controlled such as a proportional integral (PI) at a PI-control section 105. The voltage control command value Vref obtained by the current-control is inputted into a PWM-control section 36, whereat a duty thereof is calculated. The motor 20 is PWM-driven by an inverter 107 with a PWM signal calculated the duty. The motor current value Im of the motor 20 is detected by a motor current detector 108 and is subtraction-inputted into the subtracting section 102B for the feedback. An electrical angle signal θe of the motor 20 is obtained from a rotational sensor 20A such as a resolver which is connected to the motor 20.

The compensating section 110 adds a self-aligning torque (SAT) 113 detected or estimated and an inertia compensation value 112 at an adding section 114. The added result is further added with a convergence control value 111 at an adding section 115. The added result is inputted into the adding section 102A as the compensation signal CM, thereby to improve the control characteristics.

In such an electric power steering apparatus, an advanced driver assistance system (ADAS) is one of the fields that accomplish the most rapid growth in on-vehicle applications. Considering future of the vehicle society, the ADAS is a system that is developed for improving the safety and the convenience, detects the danger that an accident is occurred by circumstances where the visibility is poor, inattentive driving or the like, and prevents the accident or reduces the degree of the accident. In order to drive the vehicle, the actions including "recognition", "judgment" and "operation" are required. The ADAS supports the driver with the focus on ensuring the safety to a series of operations. The judgment whether the manual input that means the driver's hands on the steering wheel (the handle) is performed or not, that is, the technology for detecting hands-on or hands-off is existed as the technology that leads to the future automatic driving technology. It is more important to improve its detection accuracy.

The conventional technology for detecting the hands-on or the hands-off is disclosed in, for example, Japanese Unexamined Patent Publication No. H08-337181 A (Patent Document 1) and Japanese Unexamined Patent Publication No. H11-208498 A (Patent Document 2). The automatic steering apparatus disclosed in Patent Document 1 includes a mechanism that the automatic steering is released when a torsional torque Tt applied between an automatic steering input point and the handle is equal to or more than a predetermined value, and does not incorrectly release the automatic steering.

FIG. 3 shows a general configuration in a case of detecting the torsional torque Tr relate to the torsion bar and judging whether the manual input is performed or not, and a torque sensor section 200 for detecting the torsional torque Tt is disposed at the column shaft 2. The torsion bar 201 which is disposed at the torque sensor section 200 is used in the above configuration, the torsion between an input-side column shaft (IS) 2A and an output-side column shaft (OS) 2B via the torsion bar 201 is formed by a stub shaft 202, an aluminum sleeve 203 and the like, and an induced voltage at the coil 204 which is wound on an outer circumferential surface of the aluminum sleeve 203 is detected as the torsional torque Tt. The handle 1 side to the torsion bar 201 disposed at the torque sensor section 200 is the input-side column shaft (IS) 2A, the pinion side is the output-side column shaft (OS) 2B, and the reduction gears (a reduction ratio is "1/N" (N>1.0)) which comprise a worm and a worm wheel are disposed at the output-side column shaft (OS) 2B. The worm wheel attached to the output-side column shaft 2B is driven and is rotated with the reduction ratio "1/N" by the worm which is connected to the output shaft of the motor 20, and the motor 20 is controlled by the control unit (ECU) 100.

In such a structure, even when the torque detection value is equal to or more than a predetermined value $T_0$, the configuration that the automatic steering is not released in a case that a rotational angular acceleration $\theta''$ of the column shaft 2 is larger than a predetermined value A, is adopted. The automatic steering apparatus disclosed in Patent Document 2 judges the release of the automatic steering based on the difference between the torsional torque Tt generated in the column shaft 2 and the torque Ti which is needed in order that an inertia moment Ih of the handle 1 rotationally accelerates to the steering angular acceleration $\theta h''$, for accurately detecting the manual steering by the driver during the automatic steering and surely releasing the automatic steering.

That is, the above mechanism will be described with reference to a model diagram shown in FIG. 4. When the handle 1 is released and the input-side column shaft 2A is driven and is rotated with an angle $\theta_0$ from the reduction gear 3 side by the motor 20, it is assumed that the handle 1 overcomes the inertia and rotates the angle $\theta h$, and a following Expression 1 is established by setting the torsional rigidity (the spring constant) of the input-side column shaft 2A and the inertia moment of the handle 1 to "Kh" and "Ih", respectively.

$$Ih \times \theta h'' + Kh(\theta h - \theta_0) = 0 \qquad \text{[Expression 1]}$$

Here, $\theta h''$ is the rotational angular acceleration which is a second order derivative value of the angle $\theta h$. In this case, the torsional torque Tt applied to the input-side column shaft 2A is represented by a below Expression 2.

$$Tt = Kh \times (\theta_0 - \theta h) \qquad \text{[Expression 2]}$$

A following Expression 3 is established by using the above Expressions 1 and 2.

$$Tt = Ih \times \theta h'' \qquad \text{[Expression 3]}$$

As shown in the Expression 3, the torsional torque Tt can be estimated by detecting the rotational angular acceleration $\theta h''$ of the handle 1. In a case that the automatic steering is performed, when the driver rotates the handle 1 against the automatic steering force, the torsional torque Tt is generated at the input-side column shaft 2A. Since this torsional torque is a sum of the torque Ti (=Ih×$\theta h''$) which is needed in order that the inertia moment Ih of the handle 1 accelerates to the rotational angular acceleration $\theta h''$ and the manual steering torque Td by the driver, a below Expression 4 is established.

$$Tt = Ti + Td = Ih \times \theta h'' + Td \qquad \text{[Expression 4]}$$

As being clear from the above Expression 4, since the difference (Tt−Ti) between the torsional torque Tt of the input-side column shaft 2A and the needed torque Ti for rotationally accelerating the handle 1 is equal to the manual steering torque Td by the driver, a below Expression 5 is established.

$$Tt - Ti = Tt - Ih \times \theta h'' = Td \qquad \text{[Expression 5]}$$

Thus, by obtaining the above torque difference (Tt−Ti), it can be judged whether the manual steering (the manual input) of the driver is performed during the automatic steering or not.

THE LIST OF PRIOR ART DOCUMENTS

Patent Documents

Patent Document 1: Japanese Unexamined Patent Publication No. H08-337181 A
Patent Document 2: Japanese Unexamined Patent Publication No. H11-208498 A

SUMMARY OF THE INVENTION

Problems to be Solved by the Invention

The automatic steering apparatus disclosed in Patent Documents 1 and 2 detects the torsional torque Tt generated on the column shaft (the steering shaft), calculates the in-steering torque Ti from the steering angular acceleration $\theta''$ and the inertia moment Ih of the handle 1, and then performs a comparison (Tt−Ti). Thereafter, the release or the setting of the automatic steering driving of the steering is performed as needed. Accordingly, since the part corresponding to the inertia moment Ih is calculated by the information at the upstream stage from the load side which is assisted (the part corresponding to the inertia moment Ih is determined by the tuning operation), there is a problem that the inertia moment Ih is easily affected by the noise relate to the free vibration system by the spring constant Kh and the like. In order to calculate the steering angular acceleration $\theta''$, it is necessary to perform a second order derivative, and then there is a problem that the noise increases. When the derivative is performed at a changing point of the steering, the noise especially increases.

In the automatic steering apparatus disclosed in Patent Documents 1 and 2, the manual input is judged by the torque detection value (the torsional torque), and the method using the column shaft angle is not mentioned at all.

Further, installing a touch sensor on the handle is considered as the method for detecting the manual input. However, installing the touch sensor requires a high cost and there is a problem that the detection accuracy is decreased by putting on the gloves and the environments.

The present invention has been developed in view of the above-described circumstances, and an object of the present invention is to provide the electric power steering apparatus that accurately judges the manual input (hands-on or hands-off) without increasing the cost, affecting the noise relate to the free vibration system by the spring constant and the like and influencing the external disturbance. In a case that the driver grips the handle by one hand or both hands, it is judged as the hands-on (the manual input is performed). In a case that the driver does not grip the handle, it is judged as the hands-off (the manual input is not performed).

Means for Solving the Problems

The present invention relates to an electric power steering apparatus that comprises a torsion bar to a column shaft coupled to a handle, drives and controls a motor which applies an assist torque to a steering system of a vehicle by a current command value and has a function switching between an assist mode and an automatic mode, the above-described object of the present invention is achieved by that: comprising a torsion bar torsional angle calculating section to calculate a torsion bar torsional angle based on a torque information relate to the torsion bar, an output-side column shaft relative angle generating section to output an output-side relative angle from an electrical angle signal of the motor using a predetermined computing expression, an actual handle angle calculating section to calculate an actual handle angle based on the torsion bar torsional angle and the output-side relative angle, a resonance filter to obtain an estimated handle angle in a hands-off state from the output-side relative angle, and a hands-on/off judging section to judge a hands-on state when a time that a deviation angle between the actual handle angle and the estimated handle angle in the hands-off state is equal to or more than a predetermined angle is continued for a first predetermined time or more.

The above-described object of the present invention is efficiently achieved by that: wherein the hands-on/off judging section judges a hands-off state when a time that the deviation angle is smaller than the predetermined angle is continued for a second predetermine time or more after judging the hands-on state; or wherein the torque information relate to the torsion bar is a column shaft angle relate to the handle or a torsional torque relate to the torsion bar; or wherein the torsion bar torsional angle calculating section is a torsion bar torsional angle computing section to input the torsional torque and compute the torsion bar torsional angle by dividing the torsional torque by a spring constant of the torsion bar; or wherein the torsion bar torsional angle calculating section is a torsion bar torsional angle generating section to input a torque sensor detection input-side column angle and a torque sensor detection output-side column angle and generate the torsion bar torsional angle using a spring constant of the torsion bar; or wherein the output-side column shaft relative angle generating section performs an anti-rollover process to the electrical angle signal and outputs the output-side relative angle by the predetermined computing expression; or wherein the predetermined computing expression is multiplied the electrical angle signal with an electrode pairs number of the motor and a reduction ratio of the reduction mechanism; or wherein the resonance filter reproduces a resonance of the handle when a steering is steered from the output-side column shaft in an actual apparatus and has a characteristic that the estimated handle angle in the hands-off state which is obtained by inputting the output-side column angle is substantially same as the actual handle angle; or the resonance filter is a second order or higher low pass filter (LPF).

Effects of the Invention

Since the electric power steering apparatus according to the present invention performs the hands-on or hands-off judgment by utilizing the angle information of the motor which is disposed at the downstream stage of the torque sensor, estimating the handle angle using the second order or higher resonance filter in harmony with the frequency response in the hands-off, and comparing the estimated handle angle in the hands-off state with the actual handle angle, the electric power steering apparatus can perform the accurate manual input judgment without being affected by the noise relate to the free vibration system including the handle resonance. Because the second order derivative is not performed in the present invention, the manual input judgment is easily performed and is hardly affected by the noise.

BRIEF DESCRIPTION OF THE DRAWINGS

In the accompanying drawings.

MODE FOR CARRYING OUT THE INVENTION

A detection technology for judging whether driver's hands-on a steering (judging hands-on the steering, hands-off the steering or performing a manual input) is performed or not is existed in an electric power steering apparatus that has an assist mode to control a motor which applies an assist torque to a steering system of a vehicle when the driver steers the steering system, and an automatic mode to control the motor in response to a target steering angle which is continuously instructed by the vehicle when the vehicle autonomously runs. In the above detection, it is increasingly important to improve the detection accuracy without being affected by a disturbance noise.

Instead of the conventional hands-on or hands-off judgment which is performed in a torque system, the present invention proposes a method that the hands-on or hands-off judgment is performed in an angle system in which derivative is not used. Concretely, the hands-on or hands-off judgment, that is, the manual input judgment is performed by utilizing an angle information of an assist motor of the electric power steering apparatus (EPS) which is disposed at a downstream stage of a torque sensor, estimating a handle angle by using a resonance filter (for example, a second order or higher low pass filter (LPF)) which is designed in harmony with a frequency response in the hands-off, and performing a two-stage comparison which is a comparison using an angle threshold and a comparison using a time threshold based on a deviation angle between an actual handle angle calculated from the angle information with respect to the column shaft or a torsional torque and an electrical angle signal of the motor. In the present invention, a case of hands-on the steering or one-hand-on the steering is judged as the hands-on (the manual input is performed) and a case of hands-off the steering is judged as hands-off (the manual input is not performed). The accurate hands-on or hands-off judgment is performed without using the motor angular velocity and the motor angular acceleration in which the derivative calculation is performed, and being affected by the noise relate to a free vibration system due to the torsional rigidity including the handle resonance and the like.

Figure 5:
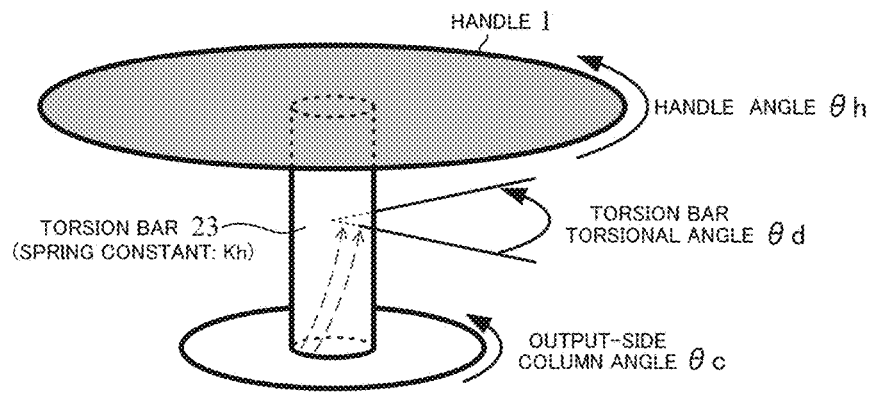
FIG. 5 is a mechanism diagram showing a relationship among a torsion bar, a handle angle and an output-side column angle.

When the output-side column shaft 2B is rotated (the rotational angle is generated) under a state that the steering system is separated from the universal joints 4a, the present invention performs the hands-on or hands-off judgment based on a phenomenon that a vibration characteristic of the input-side column shaft 2A in a case of hands-on the handle 1 is different from that in a case of hands-off the handle 1. FIG. 5 is a mechanism diagram showing a relationship among the torsion bar 23, the handle angle θh and the output-side column angle θc. When the torsion bar torsional angle is defined as "θd", a below Expression 6 is established.

$$\theta h = \theta c + \theta d \qquad \text{[Expression 6]}$$

Figure 12:
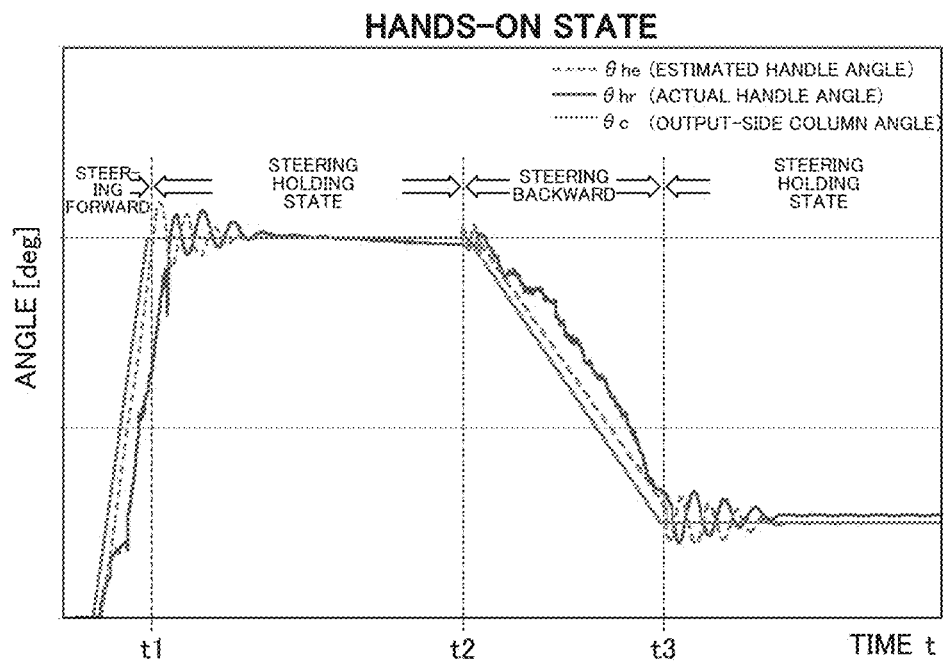
FIG. 12 is a time chart showing one example of the steering system angle characteristic in a case of a hands-off state.
Figure 13:
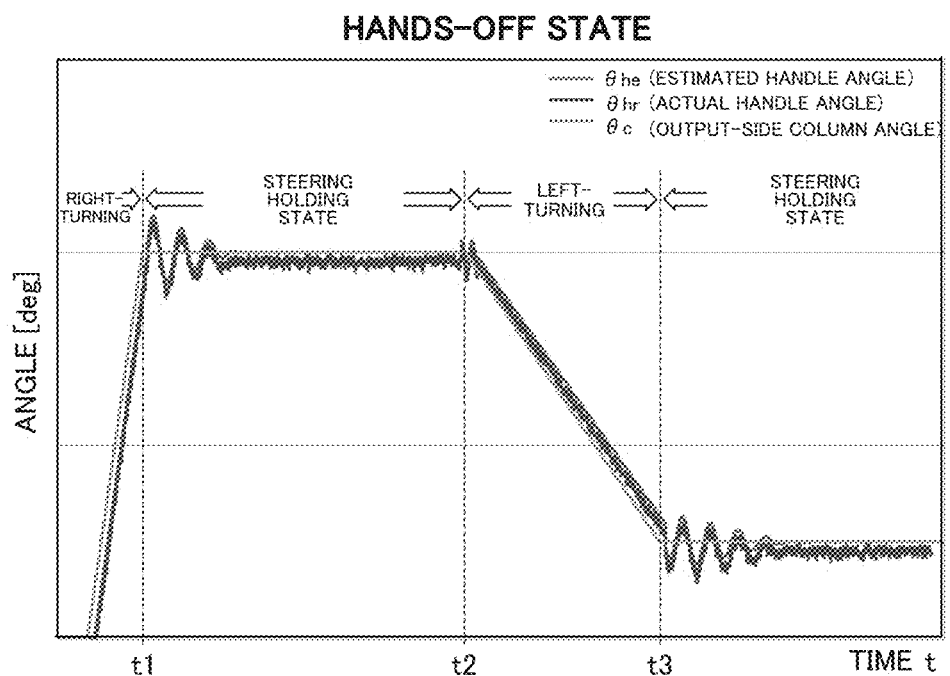
FIG. 13 is a time chart showing another example of the steering system angle characteristic in a case of a hands-off state.

FIG. 12 shows a characteristic in a case of hands-on the handle 1, that is, the actual handle angle (the input-side column angle) when the output-side column angle θc is changed, with respect to a steering-forward state (−t1), a steering holding state (t1−t2), a steering-backward state (t2−t3) and the steering holding state (t3−). As well, FIG. 13 shows a characteristic in a case of hands-off the handle 1, that is, the actual handle angle (the input-side column angle) when the output-side column angle θc is changed, with respect to a right-turning state (−t1), the steering holding state (t1−t2), a left-turning state (t2−t3) and the steering holding state (t3−). The characteristic difference between FIGS. 12 and 13 is caused by the torsion bar torsional angle θd, and the judgment of the handle hands-off state or the handle hands-on state can be done.

Embodiments according to the present invention will be described with reference to the accompanying drawings.

Figure 6:
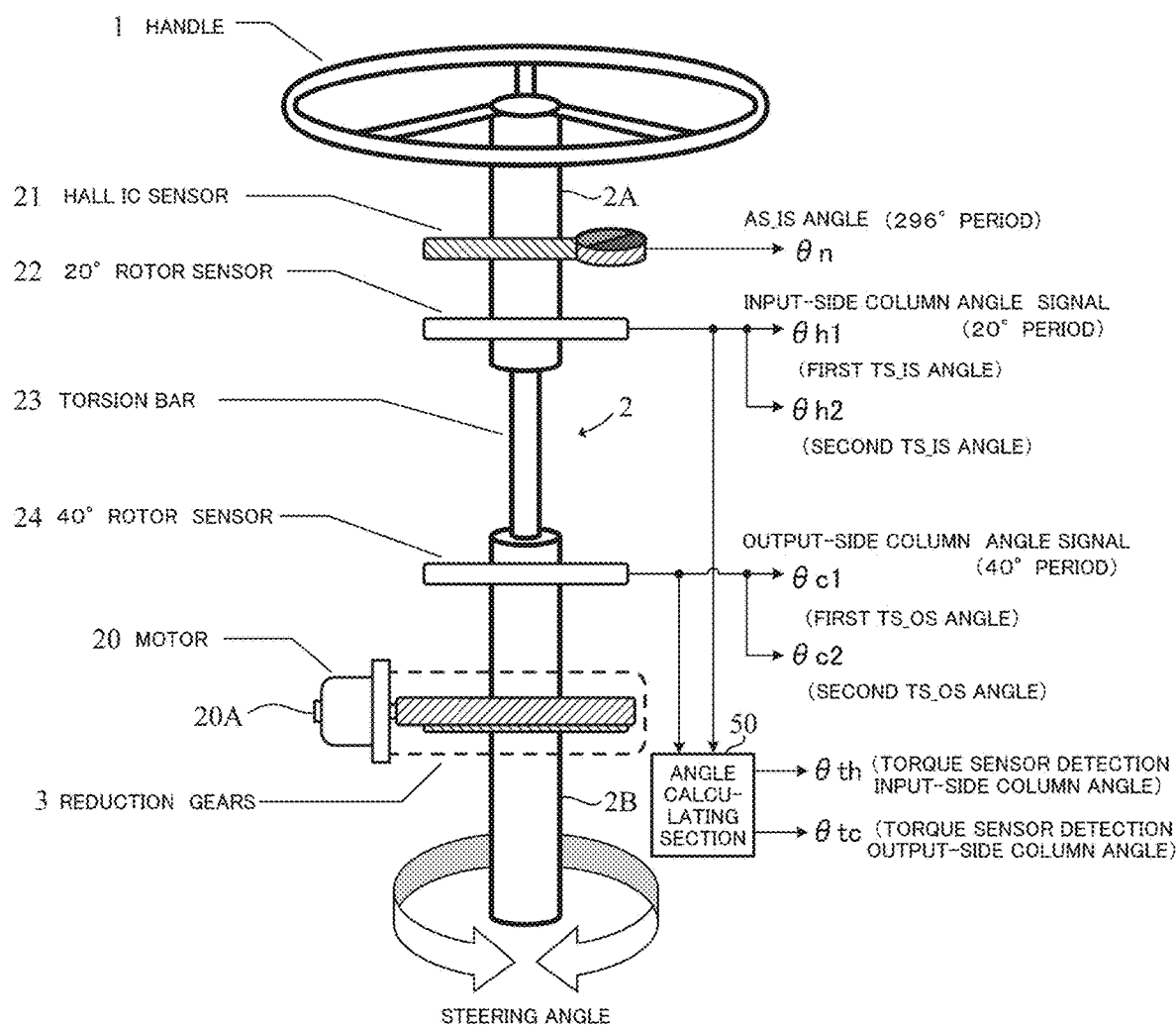
FIG. 6 is a diagram showing an installation example of sensors and a relationship between the column angle and the handle angle.

At first, in a case that the judgment is performed by using the angle information, an arrangement relationship among the various sensors will be described, as shown in FIG. 6.

A Hall IC sensor 21 as an angle sensor and a 20° rotor sensor 22 of a torque sensor input-side rotor are mounted on the input-side column shaft 2A of the handle 1 side of the column shaft 2 including the torsion bar 23. The Hall IC sensor 21 outputs an AS_IS angle θn of 296° period. The 20° rotor sensor 22 that is mounted to the handle 1 side closer than the torsion bar 23 outputs input-side column angle signals $\theta_{h1}$ (a first TS_IS angle) and $\theta_{h2}$ (a second TS_IS angle) of 20° period, and the input-side column angle signal $\theta_{h1}$ is inputted into an angle calculating section 50. A 40° rotor sensor 24 of a torque sensor output-side rotor is mounted on an output-side column shaft 2B of the column shaft 2, output-side column angle signals $\theta_{c1}$ (a first TS_OS angle) and $\theta_{c2}$ (a second TS_OS angle) from the 40° rotor sensor are outputted, and the output-side column angle signal $\theta_n$ is inputted into the angle calculating section 50. Absolute angles of the input-side column angle signal $\theta_{h1}$ and the output-side column angle signal $\theta_{c1}$ are calculated from the input-side column angle signal $\theta_{h1}$ and the output-side column angle signal $\theta_{c1}$ at the angle calculating section 50, and a torque sensor detection input-side column angle θth and a torque sensor detection output-side column angle θtc are outputted from the angle calculating section 50.

In a case that the torsional torque Tt is obtained from the torque sensor detection input-side column angle θth and the torque sensor detection output-side column angle θtc, when the spring constant of the torsion bar 23 is defined as "Kh", the torsional torque Tr can be obtained from a below Expression 7.

$$Tt = Kh(\theta th - \theta tc) \qquad \text{[Expression 7]}$$

Figure 3:
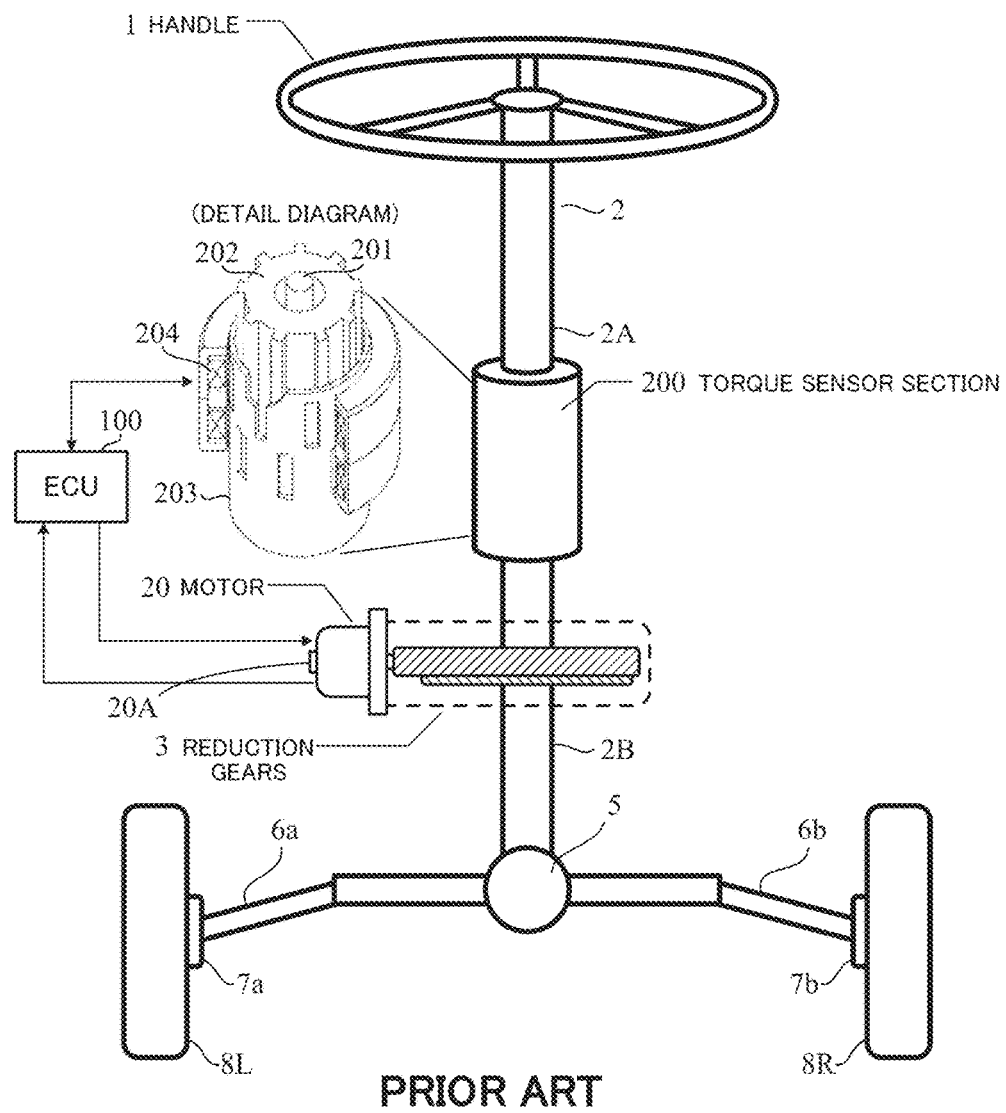
FIG. 3 is a diagram showing a mechanism of a steering shaft (a column shaft) of a column-type steering.
Figure 4:
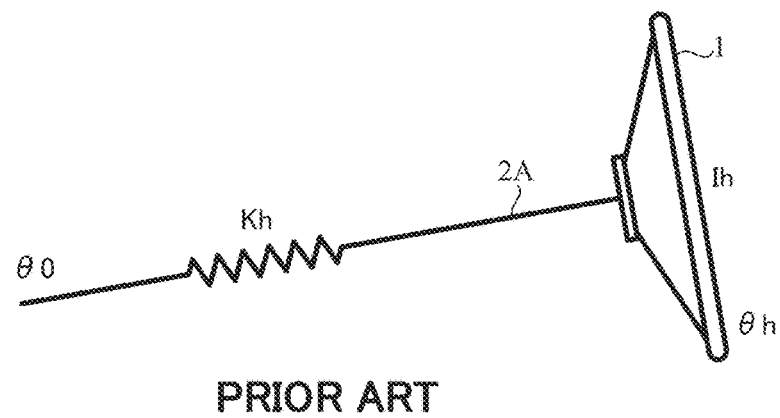
FIG. 4 is a model diagram for analyzing a force applying to the steering shaft (the column shaft)

In a case that the hands-on or hands-off judgment is performed after the torsional torque Tt is obtained from the torque detection value, the torsional torque Tt is directly obtained from an above-described configuration of FIG. 3.

Figure 7:
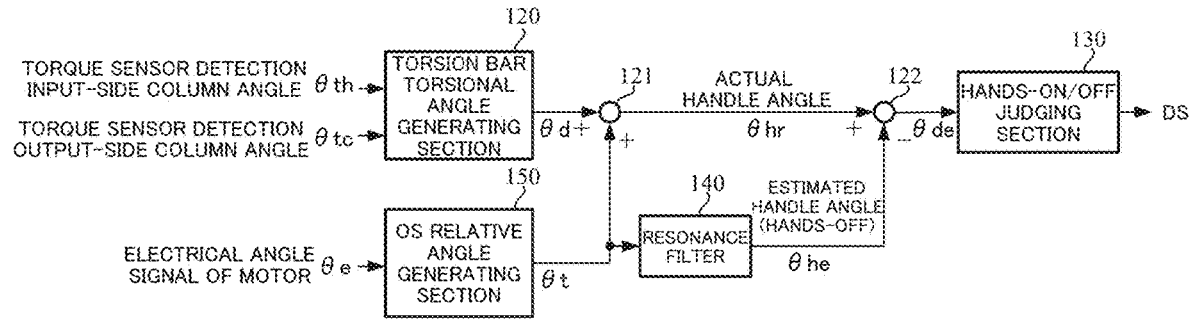
FIG. 7 is a block diagram showing a configuration example of a manual input judging section according to the present invention.

The configuration of the manual input judging section according to the present invention is adapted to both a case that the torsional torque Tt is directly detected from the configuration of FIG. 3 and a case that the torsional torque Tt is obtained from the configuration of FIG. 6. At first, an embodiment in a case that the torsional torque Tt is obtained from the configuration of FIG. 6 will be described with reference to FIG. 7.

The above configuration comprises a torsion bar torsional angle generating section 120 to input the torque sensor detection input-side column angle θth and the torque sensor detection output-side column angle θtc and generate the torsion bar torsional angle θd, an output-side (OS) relative angle generating section 150 to input the electrical angle signal θe of the motor from the rotational sensor 20A and output the output-side (OS) relative angle θt, an adding section 121 which functions as an actual handle angle computing section, adds with the torsion bar torsional angle θd and the output-side (OS) relative angle θt and outputs an actual handle angle θhr, a resonance filter 140 to input the output-side relative angle θt and output an estimated handle angle θhe in the hands-off state, a subtracting section 122 to obtain a deviation angle θde by subtracting the estimated handle angle θhe from the actual handle angle θhr, and a hands-on/off judging section to judge the hands-on or the hands-off based on the deviation angle θde.

Figure 8:
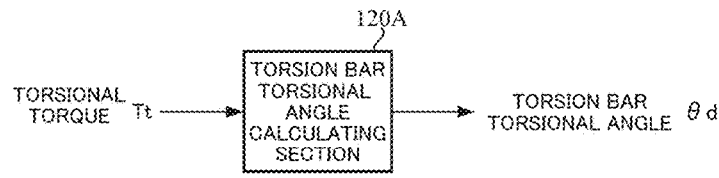
FIG. 8 is a block diagram showing a part of a configuration example in a case of inputting a torsional torque.

In the present embodiment, the torsion bar torsional angle generating section 120 obtains the torsion bar torsional angle θd ((=θth−θtc) or (=|θth−θtc|)) based on the torque sensor detection input-side column angle θth and the torque sensor detection output-side column angle θtc which are shown in FIG. 6. The torsion bar torsional angle θd is also obtained from the torsional torque Tt which is detected at the torque sensor section 200 shown in FIG. 3. FIG. 8 shows a configuration of the above case, the detected torsional torque Tt is inputted into the torsion bar torsional angle calculating section 120A and the torsion bar torsional angle calculating section 120A obtains the torsion bar torsional angle θd by calculating a following Expression 8.

$$\theta d = Tt/Kh \qquad \text{[Expression 8]}$$

The output-side relative angle generating section 110 performs an anti-rollover process using a motor electrical angle scale (a waveform process (for example, a saw tooth wave angle signal is processed to a continuous angle signal)), and outputs the output-side relative angle θt based on a following Expression 9.

$$\theta t = ee \times (1/\text{electrode pairs number}) \times (\text{reduction ratio}) \quad [\text{Expression 9}]$$

Here, "electrode pairs number" is "the number of electrode pairs of the motor" and "reduction ratio" is the reduction ratio of the reduction mechanism.

When tuning from the output side, a friction which is existed in the unit, a loss torque of the motor, a backlash of the spline unit of the motor shaft, inertia and a preload of the input-side bearing are related to the above process.

Figure 1:
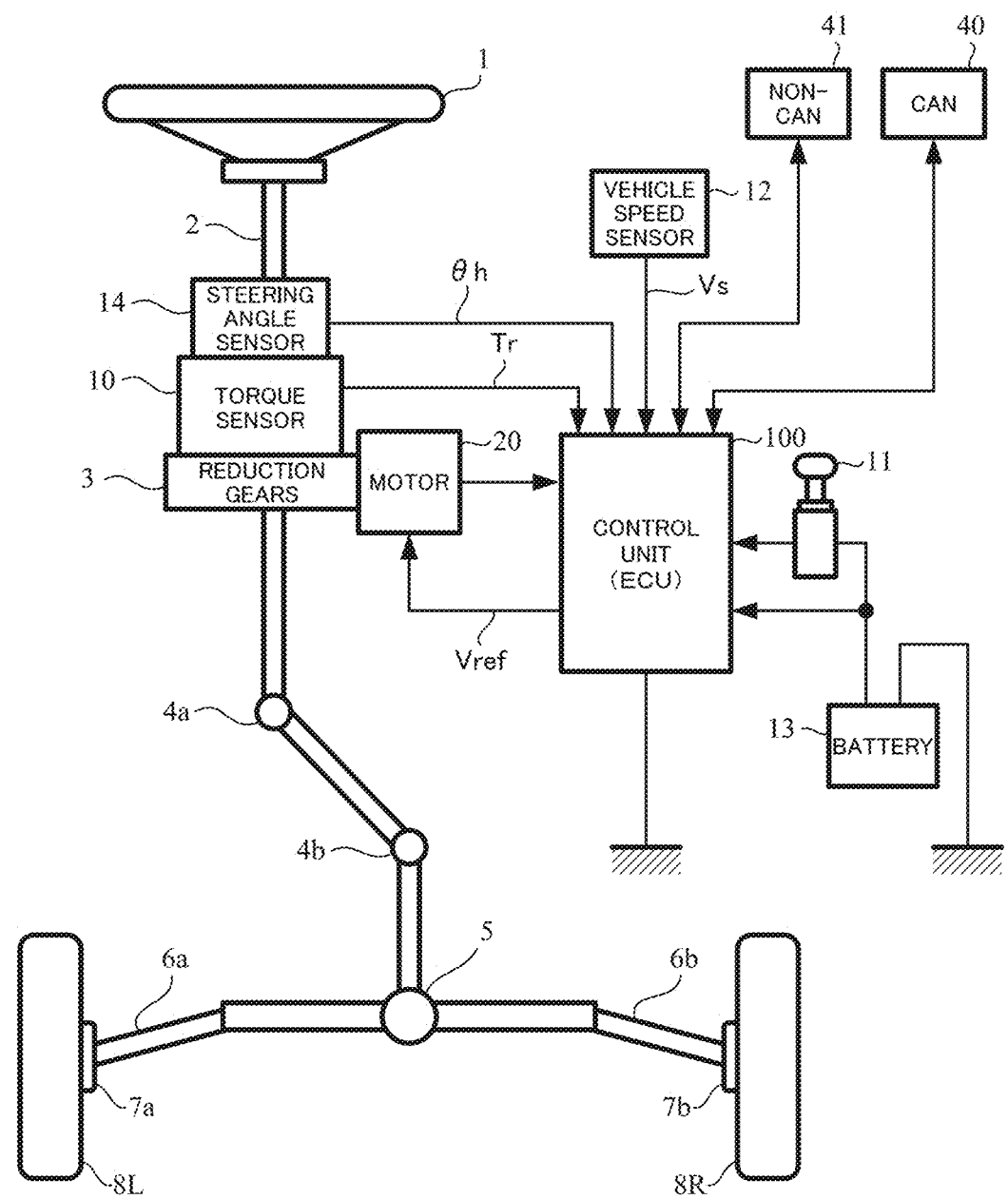
FIG. 1 is a configuration diagram showing a general outline of an electric power steering apparatus.
Figure 2:
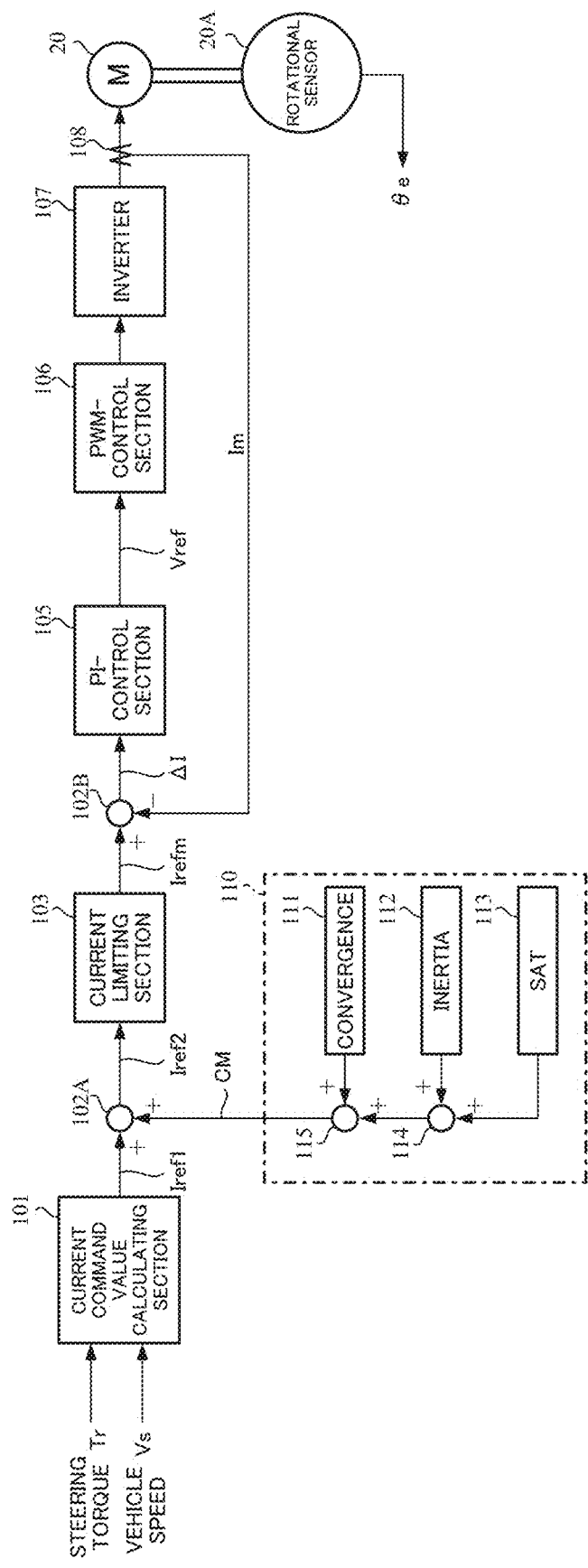
FIG. 2 is a block diagram showing a configuration example of a control unit (ECU) of the electric power steering apparatus.
Figure 9:
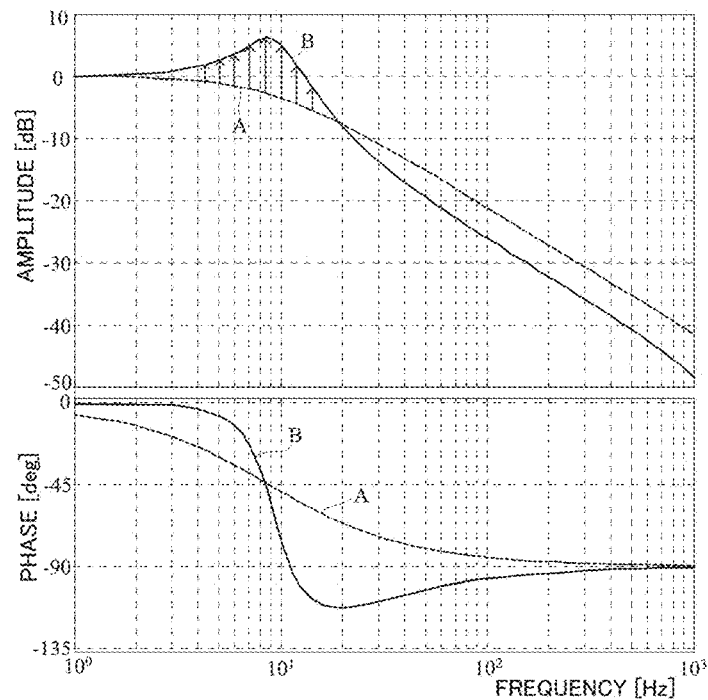
FIG. 9 is Bode diagrams showing a characteristic example of a resonance filter used in the present invention.

The resonance filter 140 which obtains the estimated handle angle θhe in the hands-off state is designed by using the reproduced data in which the resonance of the handle 1 is generated from the output-side column shaft 2B when being steered the steering on the actual apparatus, obtaining the frequency response from the measurement results of the handle angle θh which is the input-side column angle and the output-side column angle θc, and being in harmony with the above data and the above frequency response. The Bode diagrams which show the characteristic example of the resonance filter 140 are shown in the characteristic "B" (a solid line) of FIG. 9. The gain of the resonance filter 140 has a constant value up to substantially 3 [Hz], has a larger value than that of the general second-order low pass filter (LPF) shown by the characteristic "A" (a broken line) and has a protrusion shape between substantially 3 [Hz] and substantially 10 [Hz], and has a smaller value than that of the general second-order LPF shown by the characteristic "A" (the broken line) in a region that the frequency is substantially 20 [Hz] or more. The phase of the resonance filter 140 has a smaller delay than that of the general second-order LPF shown by the characteristic "A" (the broken line) up to substantially 20 [Hz], and has a larger delay than that of the general second-order LPF shown by the characteristic "A" (the broken line) in a region that the frequency is substantially 20 [Hz] or more. That is, in the actual apparatus, the bench test apparatus in which the actual vehicle is simulated or the like, the handle angle θh and the output-side column angle θc are measured by steering the output-side column shaft 2B in a state that the ECU is electrically energized and the hands of the driver are not in contact with the handle 1 (the hands-off state) (actually, the bench test apparatus is separated at the universal joints 4a in the electric power steering apparatus of FIG. 1, and the measurement is performed by applying the manual input). The torsional angle θd is obtained from the torsional torque Tt (that is, the torsional angle θd is directly obtained by the torque sensor). The handle angle θh is obtained by adding the torsional angle θd to the output-side column angle θc (refer to the Expression 6). In the design of the resonance filter, the data of the actual vehicle or the actual data of the bench test apparatus in which the actual vehicle is simulated or the like, are used in the output-side column angle θc and the handle angle θh. The resonance of the handle is included in this handle angle θh. Because the measurement is performed in the hands-off state, the ideal filter result θhe when the output-side column angle θc is inputted (the estimated handle angle in the hands-off state) should be the handle angle θh. In order to reproduce the resonance, the second order filter is needed. The designed resonance filter 140 is adjusted so that the estimated handle angle θhe in the hands-off state is in harmony with the handle angle θh of the actual data. Consequently, the resonance filter 140 has a characteristic shown in FIG. 9.

The waveforms of the actual output-side column angle θc are shown in FIGS. 12 and 13. In contrast to the waveforms of the actual output-side column angle θc, the waveforms of the actual handle angle θhr are vibrated at the changing points of the steering. The noise in the estimated handle angle θhe in the hands-off state from the resonance filter 140 is removed by the resonance filter 140 which is designed by the tuning, and then the estimated handle angle θhe is inputted into the subtracting section 122.

Figure 10:
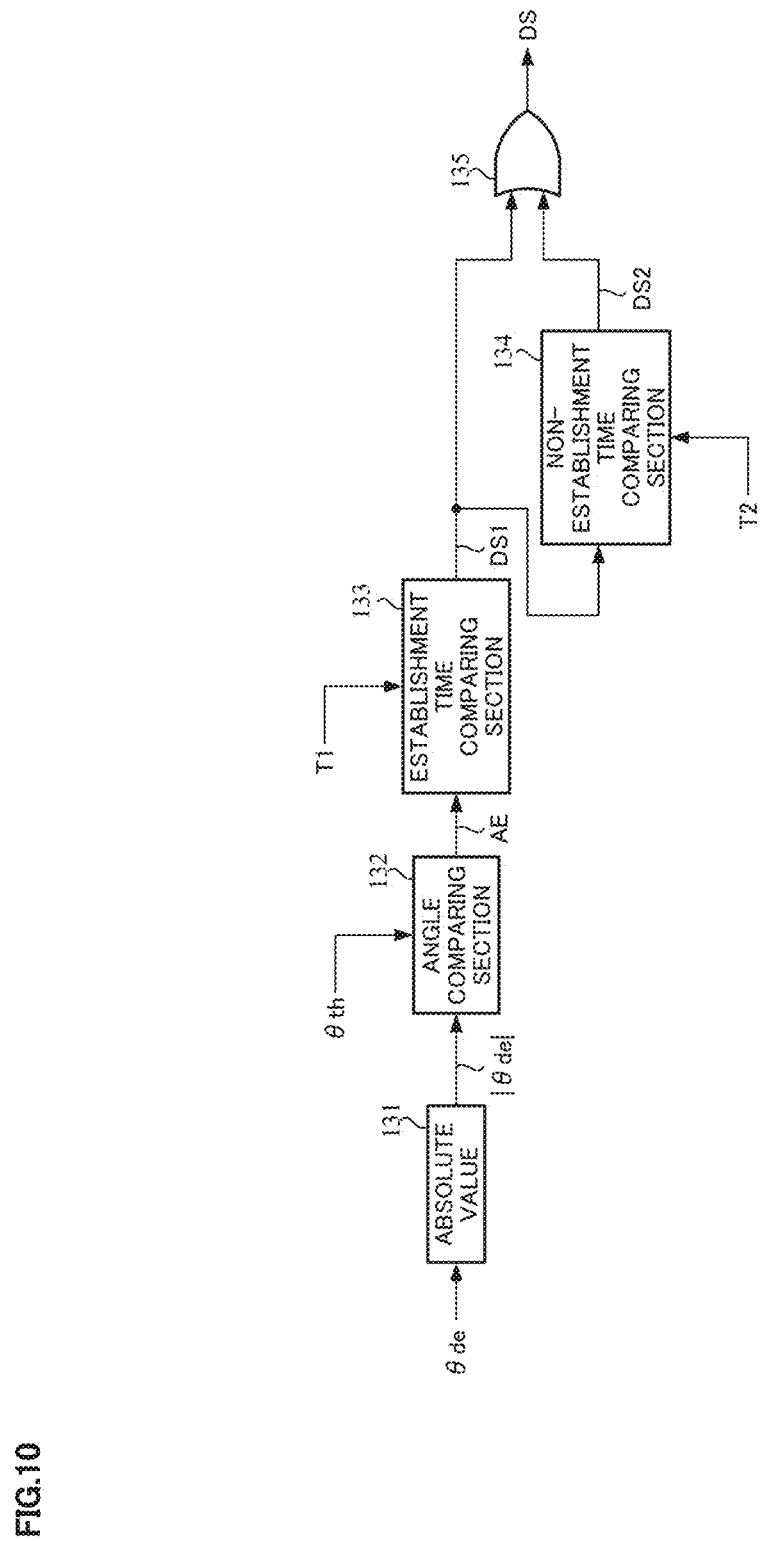
FIG. 10 is a block diagram showing a configuration example of a hands-on/off judging section.

The configuration of the hands-on/off judging section 130 is shown in, for example, FIG. 10. The deviation angle θde obtained at the subtracting section 122 is inputted into an absolute value calculating section 131, and the absolute value |θde| of the deviation angle is inputted into an angle comparing section 132 and is compared with a predetermined angle threshold θth. That is, it is judged whether a following Expression 10 is established or not.

$$|\theta hr - \theta hc| = |\theta de| \geq \theta th \quad [\text{Expression 10}]$$

In a case that the above Expression 10 is established, the angle comparing section 132 outputs an angle establishment signal AE. The angle establishment signal AE is inputted into an establishment time comparing section 133 and a non-establishment time comparing section 134. When the angle establishment signal AE continues for the predetermined time threshold T1 or more, the establishment time comparing section 133 outputs a judgment signal DS1 which shows hands-on, and the judgment signal DS1 is outputted as a judgment signal DS showing the hands-on state via an OR circuit 135. In a case that the non-establishment state in the expression 10 continues for the predetermined time threshold T2 or more after the establishment time comparing section 133 judges the hands-on state, the non-establishment time comparing section 134 outputs a judgment signal DS2 which shows the hands-off, and the judgment signal DS2 is outputted as the judgment signal DS showing the hands-off state via the OR circuit 135. The purpose that it is judged whether the hands-on state is held for the predetermined time or not will be described below. Even when the hands of the driver are in contact with the handle, it is necessary that it is not judged as the hands-off state in cases that the angle difference between the input side and the output side is not generated (for example, the road surface is flat and the vehicle runs a straight road) or the instantaneous hands-off is occurred.

As well, in the example of FIG. 10, the absolute value of the deviation angle θde is calculated and the absolute value is compared with one angle threshold θth. Alternatively, the absolute value of the deviation angle θde may not be calculated, and the deviation angle θde may be compared with positive and negative angle thresholds±θth.

Figure 11:
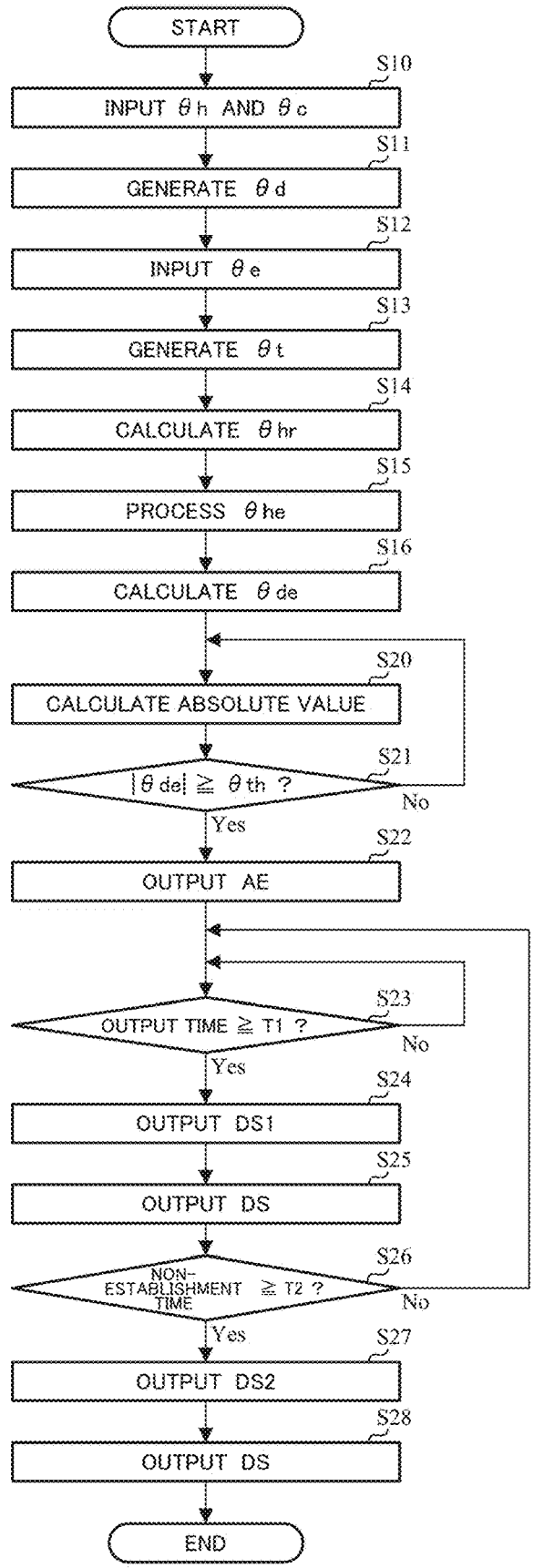
FIG. 11 is a time chart showing one example of a steering system angle characteristic in a case of a hands-on state.

In such a configuration, the operation example will be described with reference to a flowchart of FIG. 11.

At first, the torque sensor detection input-side column angle θth and the torque sensor detection output-side column angle θtc are inputted into the torsion bar torsional angle generating section 120 (Step S10), and the torsion bar torsional angle generating section 120 generates the torsion bar torsional angle θd (Step S11). The torsion bar torsional angle θd is inputted into the adding section 121. In a case of FIG. 8 that the torsional torque Tt shown in FIG. 3 is inputted, the torsional torque Tt is inputted into the torsion bar torsional angle calculating section 120A, and the torsion bar torsional angle calculating section 120A calculates the torsion bar torsional angle θd.

The motor electrical angle θe is inputted into the output-side relative angle generating section 110 (Step S12), the output-side relative angle generating section 110 generates the output-side relative angle θt (Step S13), and the output-side relative angle θt is inputted into the adding section 121 and the resonance filter 140. Next, the adding section 121 calculates the actual handle angle θhr by adding with the torsion bar torsional angle θd and the output-side relative angle θt (Step S14), and the resonance filter 140 processes the output-side relative angle θt and calculates the estimated handle angle θhe (Step S15). The actual handle angle θhr and the estimated handle angle θhe are inputted into the subtracting section 122. The subtracting section 122 calculates the deviation angle θde by subtracting the estimated handle angle θhe in the hands-off state from the actual handle angle θhr (Step S16), and the deviation angle θde is inputted into the hands-on/off judging section 130.

In the handle-on/off judging section 130, at first, the absolute value calculating section 131 obtains the absolute value |θde| of the deviation angle θde (Step S20), and the angle comparing section 132 judges whether the Expression 10 is established or not (Step S21). In a case that the Expression 10 is not established, the process is returned to the above Step S20, and in a case that the Expression 10 is established, the angle comparing section 132 outputs the angle establishment signal AE (Step S22). The angle establishment signal AE is inputted into the establishment time comparing section 133, and the duration time of the angle establishment signal AE is compared with the time threshold T1 (Step S23). When the angle establishment signal AE continues for the time threshold T1 or more, the establishment time comparing section 133 outputs the judgment signal DS1 (Step S24), and the judgment signal DS1 is outputted as the judgment signal DS via the OR circuit 135 (Step S25). After the establishment time comparing section 133 judges the hands-on state, the non-establishment time comparing section 134 judges whether the non-establishment state in the Expression 10 continues for the time threshold T2 or more or not (Step S26). When the non-establishment state continues for the time threshold T2 or more, the non-establishment time comparing section 134 outputs the judgment signal DS2 (Step S27), and the judgment signal DS2 is outputted as the judgment signal DS via the OR circuit 135 (Step S28).

In the actual apparatus, the bench test apparatus in which the actual vehicle is simulated or the like, FIG. 12 shows the waveform examples of the estimated handle angle θhe, the actual handle angle θhr and the output-side column angle θc in a state that the ECU is electrically energized and the hands of the driver are in contact with the handle (the hands-on state). In FIG. 12, the steering-forward is performed up to the time point t1, the steering-holding is performed between the time point t1 and the time point t2, the steering-backward is performed between the time point t2 and the time point t3, and the steering-holding is performed after the time point t3. FIG. 13 shows the waveform examples of the respective angles with the same time scale of FIG. 12 in a state that the hands of the driver are not in contact with the handle (the hands-off state).

EXPLANATION OF REFERENCE NUMERALS

1 handle (steering wheel)
2 column shaft (handle shaft)
2A input-side column shaft (IS)
2B output-side column shaft (OS)
20 motor
23, 201 torsion bar
100 control unit (ECU)
120 input and output (IS/OS) deviation angle generating section
130 hands-on/off judging section
140 resonance filter
150 output-side (OS) relative angle generating section
200 torque sensor section

The invention claimed is:

1. An electric power steering apparatus that comprises a torsion bar to a column shaft coupled to a handle, drives and controls a motor which applies an assist torque to a steering system of a vehicle by a current command value and has a function switching between an assist mode and an automatic mode, comprising:
a torsion bar torsional angle calculating section to calculate a torsion bar torsional angle based on a torque information relate to said torsion bar,
an output-side column shaft relative angle generating section to output an output-side relative angle from an electrical angle signal of said motor using a predetermined computing expression,
an actual handle angle calculating section to calculate an actual handle angle based on said torsion bar torsional angle and said output-side relative angle,
a resonance filter to obtain an estimated handle angle in a hands-off state from said output-side relative angle, and
a hands-on/off judging section to judge a hands-on state when a time that a deviation angle between said actual handle angle and said estimated handle angle in said hands-off state is equal to or more than a predetermined angle is continued for a first predetermined time or more.

2. The electric power steering apparatus according to claim 1,
wherein said hands-on/off judging section judges a hands-off state when a time that said deviation angle is smaller than said predetermined angle is continued for a second predetermine time or more after judging said hands-on state.

3. The electric power steering apparatus according to claim 1,
wherein said torque information relate to said torsion bar is a column shaft angle relate to said handle or a torsional torque relate to said torsion bar.

4. The electric power steering apparatus according to claim 3,
wherein said torsion bar torsional angle calculating section is a torsion bar torsional angle computing section to input said torsional torque and compute said torsion bar torsional angle by dividing said torsional torque by a spring constant of said torsion bar.

5. The electric power steering apparatus according to claim 3,
wherein said torsion bar torsional angle calculating section is a torsion bar torsional angle generating section to input a torque sensor detection input-side column angle and a torque sensor detection output-side column angle and generate said torsion bar torsional angle using a spring constant of said torsion bar.

6. The electric power steering apparatus according to claim 1,
wherein said output-side column shaft relative angle generating section performs an anti-rollover process to said electrical angle signal and outputs said output-side relative angle by said predetermined computing expression.

7. The electric power steering apparatus according to claim 6,
   wherein said predetermined computing expression is multiplied said electrical angle signal by an electrode pairs number of said motor and a reduction ratio of said reduction mechanism.

8. The electric power steering apparatus according to claim 1,
   wherein said resonance filter reproduces a resonance of said handle when a steering is steered from said output-side column shaft in an actual apparatus and has a characteristic that said estimated handle angle in said hands-off state which is obtained by inputting said output-side column angle is substantially same as said actual handle angle.

9. The electric power steering apparatus according to claim 8,
   wherein said resonance filter is a second order or higher low pass filter (LPF).

\* \* \* \* \*